United States Patent [19]

Schmidt et al.

[11] Patent Number: 4,890,940
[45] Date of Patent: Jan. 2, 1990

[54] MAGNETIC LIQUID SEALING RING INSTALLED IN AN ANTIFRICTION BEARING

[75] Inventors: Anton Schmidt, Hassfurt; Wilhelm Walter, Oberthulma; Focko Bruns, Poppenhausen, all of Fed. Rep. of Germany

[73] Assignee: Fag Kugelfischer Georg Schafer (KGaA), Fed. Rep. of Germany

[21] Appl. No.: 301,661

[22] Filed: Jan. 25, 1989

[30] Foreign Application Priority Data

Feb. 3, 1988 [DE] Fed. Rep. of Germany ... 8801298[U]

[51] Int. Cl.$^4$ ............................................. F16C 33/82
[52] U.S. Cl. ..................................... 384/446; 384/478; 277/80
[58] Field of Search ............... 384/446, 478, 133, 488, 384/465, 130; 277/80

[56] References Cited

U.S. PATENT DOCUMENTS

| | | | |
|---|---|---|---|
| 4,598,914 | 7/1986 | Furumura et al. | 384/133 |
| 4,605,233 | 8/1986 | Sato | 277/80 |
| 4,765,756 | 8/1988 | Gabelli | 277/80 |
| 4,797,013 | 1/1989 | Raj et al. | 384/478 |

*Primary Examiner*—Lenard A. Footland
*Attorney, Agent, or Firm*—Ostrolenk, Faber, Gerb & Soffen

[57] ABSTRACT

A magnetic liquid sealing ring installed in an antifriction bearing between the outer and the inner rings is an integral structure comprised of a sealing ring, which is engaged in the bearing outer ring, and of a pre-seal at the axial inside of the sealing ring. Magnetic liquid elements are supported radially inward of the sealing ring by a magnet in the sealing ring. The pre-seal has an annular groove opening toward the bearing inner ring for holding escaping liquid. An axially outwardly facing shoulder formed on the bearing inner ring raceway cooperates with an axially inwardly facing inside of the pre-seal for defining a slot between them and those surfaces are inclined obliquely to the rolling elements and to the axis of the bearing.

11 Claims, 1 Drawing Sheet

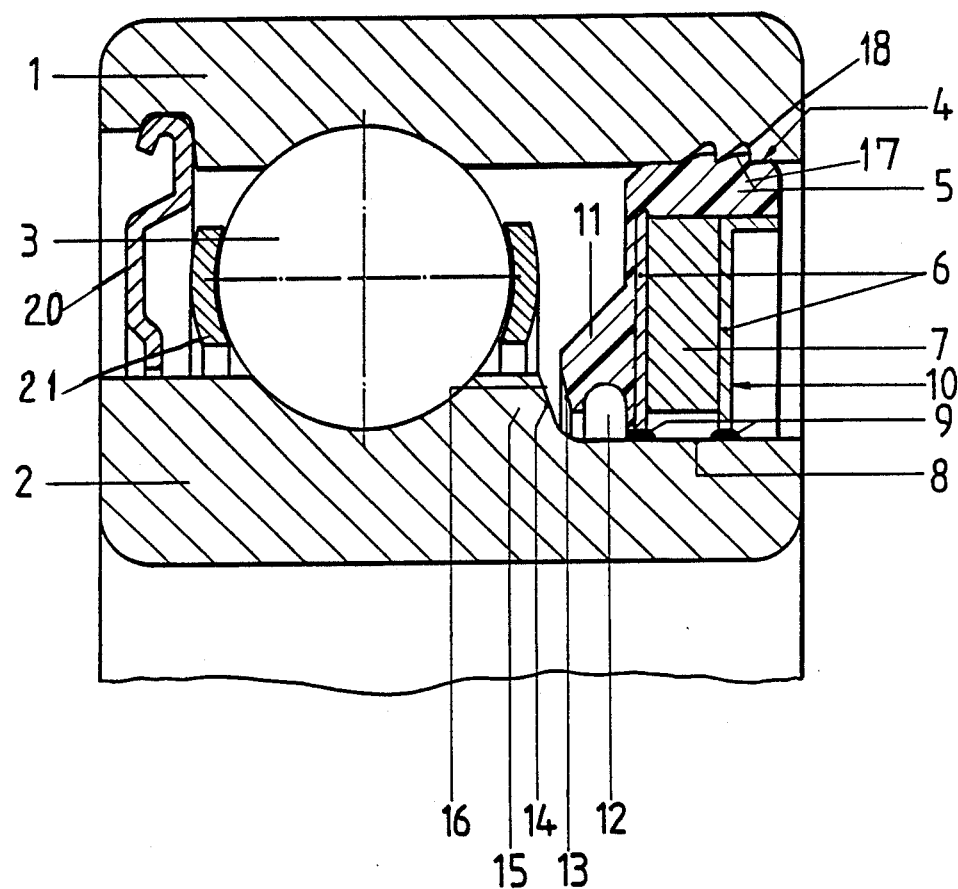

MAGNETIC LIQUID SEALING RING INSTALLED IN AN ANTIFRICTION BEARING

BACKGROUND OF THE INVENTION

The present invention refers to a sealing ring for use in an antifriction bearing, and more particularly to a magnetic liquid sealing ring.

In a known seal of this type which is used, for instance, in a ball bearing, a magnetic liquid sealing ring is arranged on the bearing outer ring. That sealing ring faces a cylindrical surface of the inner ring, with a small slot radially between them. A magnetic liquid is held fast in that slot by a magnet. In order to prevent mixing of the magnetic liquid with the lubricant of the antifriction bearing as far as possible, a pre-seal element is fastened to the magnetic liquid sealing ring on the axial side toward the balls. The pre-seal comprises a metal disc with a sealing edge which, with a slight slot radially between them, faces the cylindrical surface of the inner ring. If the sealing edge were to rest against the bearing inner ring, that would produce too large a moment of friction for many installations However, this slot at the pre-seal is highly likely to permit bearing lubricant to enter the magnetic liquid and mix with it over time, which would destroy the sealing action at the magnetic liquid.

SUMMARY OF THE INVENTION

The object of the present invention is to define a pre-seal so that, despite the radial slot, the lubricant from the bearing is better held away from the magnetic liquid sealing ring while, at the same time, the magnetic liquid is also held in the sealing slot.

The invention concerns a magnetic liquid sealing ring for being installed in an anti-friction bearing. That bearing includes an inner ring, an outer ring and a row of rolling elements, such as balls, which roll between the radially spaced apart inner and outer rings. The magnetic liquid sealing ring includes a sealing ring which has an annular outer portion for engaging the outer ring. The sealing ring extends radially toward the inner ring but is radially slightly spaced from it. The sealing ring also supports a magnet. Magnetic liquid is supported in the slight radial space between the sealing ring and the bearing inner ring.

There is a pre-seal element that is affixed to the axially inner side of the sealing ring. The pre-seal has its own axially inward end surface that is spaced axially inwardly closer to the rolling elements than the axially inner side of the sealing ring. The pre-seal has an annular groove defined in its radially inner surface and located between the axially inner end surface of the pre-seal and the inner surface of the sealing ring, and that annular groove traps escaping liquids therein such as lubricant moving outwardly from the rolling elements.

The sealing ring and the pre-seal may be both formed of a resilient material and may be integrally formed in one piece.

For effective return of escaping lubricant to the rolling elements, the axially inner end surface of the pre-seal is inclined obliquely to the direction of the rolling elements and to the axis of the bearing.

Cooperating with this surface of the preseal, the bearing inner ring includes a shoulder with a side thereof which faces axially outward toward the axially inner side of the pre-seal. The shoulder is also inclined obliquely, whereby a slot is defined between the surface of the shoulder and the axially inner surface of the pre-seal.

The integration of the pre-seal with the magnetic liquid sealing ring produces a single unit, which is favorable from the standpoints of manufacture and installation. The annular groove in the pre-seal collects any liquid which may have moved out of the magnetic slot and, during certain phases of operation, passes the liquid back into the slot. Upon the mounting of the seal, furthermore, magnetic liquid which has been initially forced away collects in the annular groove and is thus not lost. Since the sealing lip of the pre-seal is not opposite a flat cylindrical surface but rather its outer side surface faces the axial endsurface of a shoulder of the inner race with a slight slot between them, a longer slot region is obtained. In operation, since at least one of the facing surfaces moves with respect to the other, a centrifugal effect is produced which additionally impedes the penetration of lubricants into the labyrinth slot. The annular groove located in front of the labyrinth prevents magnetic liquid from passing into the centrifugal slot at the race shoulder and thereby prevents it from being lost.

In the preferred embodiment, because the annular surfaces forming the centrifugal slot are inclined obliquely towards the rolling bodies, i.e., the balls, the lubricant is flung back toward the balls which improves the lubrication of the antifriction bearing.

BRIEF DESCRIPTION OF THE DRAWINGS

Other objects and features of the present invention will become apparent from the following description of a preferred embodiment of the invention considered in conjunction with the accompanying drawing, which is a partial cross-section through a ball bearing having a seal in accordance with the invention.

DESCRIPTION OF THE PREFERRED EMBODIMENT

A ball bearing in which the invention is incorporated comprises an outer bearing ring 1, an inner bearing ring 2, a row of bearing balls 3 and the seal 4, which is between the rings and is shown at the right in the drawing.

The seal 4 is formed of a resilient, plastic material holding part 5 which supports two axially spaced, annular pole discs 6 and an annular magnet 7 between the discs and their magnetic parts are vulcanized in the holding part. The pole discs 6 have edges that face radially inward and each defines a small annular slot that is radially spaced from and faces a stepped down surface 8 of the inner ring. Within the annular slot, there is an annular band of magnetic liquid 9 which is held in the slot under the action of the ring magnet 7. This sealing part can be referred to as a magnetic-sealing ring 10.

An axially inward pre-seal section 11 of resilient material is integrated as one piece with the sealing ring 10. The pre-seal is provided in its inner, bore surface with an annular liquid trapping groove 12. Its axially inner side surface 13 faces toward the axially outward front surface 14 of the shoulder 15 of the inner ring over a small centrifugal slot. In this way, any magnetic liquid 9 which migrates away from the ring 10 is collected in the groove 12. In a different phase of operation, that liquid passes again into the annular slot inside the pole discs 6. This provides a longer life seal. The magnetic liquid is further kept away, in desired fashion, from the circumferential slot 16. This produces a conveying action in the direction toward the bearing space when the facing surfaces 13 and 14 move with respect to each other. In this way, the lubricant is held in the bearing, since any lubricant which has passed into the slot 16 is thrown back again into the axial space occupied by the balls by the oblique surfaces 13 and 14, as a result of the centrifugal force exerted. In this way, improved lubrication of the ball bearing is also obtained.

The holding part 5 has projections 17 which project into and lock in grooves 18 in the outer ring 18, so that the holding part rotates with the outer ring 1 and with respect to the inner ring.

There is a conventional seal 20 shown at the other axial side of the bearing. Also, the balls 3 are guided in a conventional cage 21.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A magnetic liquid sealing ring for being installed in an antifriction bearing wherein the bearing includes an inner ring, an outer ring and a row of rolling elements between the inner and the outer rings; the magnetic liquid sealing ring comprising:
    a sealing ring having an annular outer portion for engaging the outer ring and the sealing ring extending toward the inner ring; the sealing ring including an axial inner side facing axially-inwardly toward the row of rolling elements;
    a pre-seal element affixed to the inner side of the sealing ring; the pre-seal element having an end surface spaced axially inwardly closer to the rolling elements than the inner side of the sealing ring; and the pre-seal having an annular groove defined in its radially inner surface and located between the end surface of the pre-seal element and the inner side of the sealing ring for trapping escaping liquid therein.

2. The magnetic liquid sealing ring of claim 1, wherein the sealing ring is of resilient material.

3. The magnetic liquid sealing ring of claim 2, wherein the pre-seal element is also of resilient material.

4. The magnetic liquid sealing ring of claim 3, wherein the pre-seal element is integrally formed in one piece with the sealing ring.

5. The magnetic liquid sealing ring of claim 1, wherein the end surface of the pre-seal element is inclined obliquely to the rolling elements and to the axis of the bearing and the axis of the magnetic liquid sealing ring.

6. In combination, a bearing comprising an outer bearing ring, an inner bearing ring and a row of rolling elements disposed between the outer bearing ring and the inner bearing ring, and the magnetic liquid sealing ring of claim 1, wherein
    the sealing ring is attached to the interior of the outer bearing ring to rotate with the outer bearing ring and with respect to the inner bearing ring;
    a magnetic liquid seal disposed between the sealing ring and the inner bearing ring; the magnetic liquid seal being located axially outward of the preseal element and including at least a portion thereof at the axial inner side of the sealing ring;
    the annular groove in the pre-seal element opening toward the inner bearing ring 7. The bearing of claim 6, wherein the bearing inner ring includes a shoulder including a side thereof which faces axially outward toward the pre-seal element, and the shoulder is so shaped and placed and the sealing ring and the pre-seal element are so shaped and placed that the axial outward face of the shoulder is spaced from the end surface of the pre-seal element for defining a radially extending slot between them.

8. The bearing of claim 7, wherein the magnetic liquid sealing ring is of resilient material and the pre-seal element is also of resilient material.

9. The bearing of claim 8, wherein the preseal element is internally formed in one piece with the sealing ring.

10. The bearing of claim 7, wherein the axially outwardly facing surface of the race shoulder and the inwardly facing end surface of the pre-seal element are each inclined obliquely to the rolling elements and to the axis of the bearing and of the magnetic liquid sealing ring.

11. The bearing of claim 7, further comprising a magnet disposed in the sealing ring for magnetizing and holding the magnetic liquid seal at the inner bearing ring radially inside the sealing ring.

* * * * *